(12) United States Patent
Liu et al.

(10) Patent No.: US 11,373,492 B2
(45) Date of Patent: Jun. 28, 2022

(54) INTELLIGENT EVACUATION SYSTEM AND METHOD USED IN SUBWAY STATION FIRE

(71) Applicant: Shandong University of Science and Technology, Qingdao (CN)

(72) Inventors: Zhaohui Liu, Qingdao (CN); Chao Wang, Qingdao (CN); Runze Song, Qingdao (CN); Junbo Wang, Qingdao (CN); Zhifa Yang, Qingdao (CN); Youqi Wang, Qingdao (CN); Xiangzhi Zhang, Qingdao (CN)

(73) Assignee: SHANDONG UNIVERSITY OF SCIENCE AND TECHNOLOGY, Shandong (CN)

( * ) Notice: Subject to any disclaimer, the term of this patent is extended or adjusted under 35 U.S.C. 154(b) by 0 days.

(21) Appl. No.: 17/132,615

(22) Filed: Dec. 23, 2020

(65) Prior Publication Data
US 2021/0201634 A1    Jul. 1, 2021

(30) Foreign Application Priority Data
Dec. 26, 2019   (CN) .......................... 201911361315.8

(51) Int. Cl.
*G08B 17/10*       (2006.01)
*G08B 7/06*        (2006.01)
(Continued)

(52) U.S. Cl.
CPC .............. *G08B 7/066* (2013.01); *A62C 37/11* (2013.01); *G06T 7/593* (2017.01); *G08B 17/10* (2013.01);
(Continued)

(58) Field of Classification Search
CPC ...... G08B 7/066; G08B 17/10; G08B 17/125; G08B 25/10; A62C 37/11; G06T 7/593
(Continued)

(56) References Cited

U.S. PATENT DOCUMENTS

| 6,529,128 B2 * | 3/2003 | Weng | G08B 7/066 340/5.1 |
| 2003/0234725 A1 * | 12/2003 | Lemelson | G08B 7/066 340/521 |

(Continued)

*Primary Examiner* — Tai T Nguyen
(74) *Attorney, Agent, or Firm* — Brundidge & Stanger, P.C.

(57) ABSTRACT

The invention relates to an intelligent evacuation system and method used in a subway station fire. A fire alarm module discovers a fire and transmits fire information, a fire source positioning module positions a fire source according to the collected picture information and smoke information of the fire, an indoor pedestrian positioning module positions pedestrians in a subway station; a relay control module is connected with the fire alarm module, the fire source positioning module and the indoor pedestrian positioning module, and the relay control module combines fire information, fire source positioning information and pedestrian positioning information; and a master control module is connected with the relay control module, and the master control module plans a dynamic escape route for each pedestrian according to the combined information, pedestrian information collected by a subway APP and pedestrian information collected by a map management system, and generates an escape route guide map.

16 Claims, 3 Drawing Sheets

(51) Int. Cl.
*G06T 7/593* (2017.01)
*H04W 4/024* (2018.01)
*H04W 4/33* (2018.01)
*H04W 4/90* (2018.01)
*H04W 4/80* (2018.01)
*A62C 37/11* (2006.01)
*G08B 17/12* (2006.01)
*G08B 25/10* (2006.01)
*G08B 25/14* (2006.01)
*H04W 4/02* (2018.01)

(52) U.S. Cl.
CPC ........... *G08B 17/125* (2013.01); *G08B 25/10* (2013.01); *G08B 25/14* (2013.01); *H04W 4/024* (2018.02); *H04W 4/025* (2013.01); *H04W 4/33* (2018.02); *H04W 4/80* (2018.02); *H04W 4/90* (2018.02); *G06T 2207/30232* (2013.01)

(58) Field of Classification Search
USPC .......................................................... 340/628
See application file for complete search history.

(56) References Cited

U.S. PATENT DOCUMENTS

| | | | | |
|---|---|---|---|---|
| 2014/0340216 | A1* | 11/2014 | Puskarich | G08B 17/11 340/539.11 |
| 2015/0137967 | A1* | 5/2015 | Wedig | G08B 17/10 340/501 |
| 2016/0123741 | A1* | 5/2016 | Mountain | H04N 5/44 701/533 |
| 2019/0295207 | A1* | 9/2019 | Day | G06Q 90/205 |

* cited by examiner

INTELLIGENT EVACUATION SYSTEM AND METHOD USED IN SUBWAY STATION FIRE

TECHNICAL FIELD

The invention relates to the field of evacuation in a subway station fire, in particular to an intelligent evacuation system and method used in a subway station fire.

BACKGROUND

The development of subway industry in China is later than that of developed countries, and the research on personnel evacuation in a subway fire also lags behind that of foreign countries. Meanwhile, due to the special operating environment, complex structure, large carrying capacity, relatively closed space and other characteristics of a subway, if an emergency occurs, it will pose a great threat to the safety of people's lives and property. In recent years, with the large-scale construction of urban subways, the research on subway safety issues has gradually arisen. At present, there is no literature closely related to the dynamic guidance of emergency evacuation of pedestrians in case of a fire in subway stations, and there are few research results on safety issues after the completion of subway construction, especially on emergency management.

At present, the fire alarm system in subway stations can only send out a fire alarm, but cannot locate the fire source within a short time, or effectively control the fire in the early stage; the static emergency evacuation guide map arranged in subway stations is usually ignored by pedestrians in practical application, besides, people have no time to attend to the guide map in case of a fire, so the reliability of the guide map is poor; furthermore, the emergency evacuation light can't conduct dynamic guidance according to development of fire; and to realize the dynamic escape route guidance of pedestrians, indoor positioning technologies must be studied.

The GNSS/A-GNSS (Assisted Satellite Navigation) system currently used cannot work indoors due to the failure in locating enough satellites. Although cellular network positioning technologies such as E-CID and OTDOA can cover indoor signals, the accuracy is not satisfactory.

SUMMARY

The invention aims to provide an intelligent evacuation system and method used in a subway station fire, which can quickly determine the position of a fire source, position pedestrians with high precision, and dynamically plan the best escape route for individuals in a fire.

In order to achieve the above purpose, the invention provides the following scheme:

An intelligent evacuation system used in a subway station fire comprises a terminal node, a relay control module and a master control module; the terminal node comprises a fire alarm module, a fire source positioning module and an indoor pedestrian positioning module; the terminal node is used for collecting and processing fire detection, fire source positioning and indoor pedestrian positioning data, sending the detection result of the node and receiving background instructions; the fire alarm module is used for discovering a fire and transmitting fire information; the fire alarm module is connected with the fire source positioning module, and the fire source positioning module is used for positioning a fire source according to the collected picture information and smoke information of the fire; the indoor pedestrian positioning module is used for positioning pedestrians in a subway station; the relay control module is connected with the fire alarm module, the fire source positioning module and the indoor pedestrian positioning module, and the relay control module is used for combining fire information, fire source positioning information and pedestrian positioning information; and the master control module is connected with the relay control module, and the master control module is used for planning a dynamic escape route for each pedestrian according to the combined information, pedestrian information collected by a subway APP and pedestrian information collected by a map management system, and generating an escape route guide map.

Alternatively, the fire alarm module comprises fire detectors, microprocessors, digital radio stations and fire control facility modules, the fire detectors are used for discovering a fire, and the microprocessors are connected with the fire detectors; the microprocessors are used for receiving a fire signal, the digital radio stations are connected with the microprocessors, and the digital radio stations are used for receiving and transmitting the fire signal; and the fire control facility modules are connected with the microprocessors, the fire control facility modules are used for switching on relevant fire control equipment according to the fire signal, and the microprocessors are connected with the relay control module.

Alternatively, the fire source positioning module comprises a binocular camera, a smoke sensor probe and a central controller, the binocular camera is used for collecting the video sequence of a fire, the smoke sensor probe is used for collecting smoke information, the central controller is connected with the binocular camera and the smoke sensor probe, the central controller is used for analyzing and processing the video sequence and the smoke information to determine the position of a fire source, and the central controller is connected with the relay control module.

Alternatively, the indoor pedestrian positioning module comprises switches, 5G base stations, WLAN base stations, decision control systems and mobile devices, and the switches are used for providing a communication port for an APP to read position information; the 5G base stations and the WLAN base stations serve as acquisition receivers to acquire the time when pedestrians reach a preset place; the mobile devices are used for sending out a real-time movement signal; and the decision control systems are connected with the switches, the 5G base stations, the WLAN base stations and the mobile devices, the decision control systems are used for determining indoor pedestrian positions according to time information and the real-time movement signal information, and the decision control systems are connected with the relay control module.

An intelligent evacuation method used in a subway station fire comprises the following steps:

transmitting fire information in time through a fire alarm module, and determining whether to turn on relevant fire control equipment according to the actual situation;

determining the position of a fire source through a fire source positioning module according to the fire information;

collecting smoke diffusion information through the fire source positioning module;

determining the positions of each pedestrian in the subway station through an indoor pedestrian positioning module using various indoor positioning fusion technologies; and planning a dynamic escape route guide map for each pedestrian according to the actual situation based on the fire information, the fire source position, the smoke diffusion information and the pedestrian positions, and sending the dynamic escape route guide map to a mobile device APP.

Alternatively, the transmission of the fire information in time through the fire alarm module and the determination as to whether to turn on relevant fire control equipment according to the actual situation specifically comprise:

obtaining a fire signal after a fire is discovered in a subway station through a fire detector;

transmitting the fire signal through a microprocessor and a digital radio station; and determining whether to turn on or turn off the fire control equipment according to the fire signal.

Alternatively, the determination of the position of a fire source through the fire source positioning module according to the fire information specifically comprises:

acquiring a stereo image pair through a binocular camera;

processing the stereo image pair with a deep learning technology to obtain characteristic information contained in the stereo image pair and carrying out similarity measurement;

carrying out stereo matching on the characteristic information, determining parallax, and calculating the three-dimensional coordinates of the fire source; and determining the position of the fire source according to the three-dimensional coordinates of the fire source.

Alternatively, the collection of the smoke diffusion information through the fire source positioning module specifically comprises:

collecting smoke information through a smoke sensor probe;

setting a fire scene, maximum heat release power and on-off parameter values of fire control hardware facilities by using a central controller according to the position of the fire source; and obtaining smoke diffusion direction and diffusion speed information according to the smoke information and the on-off parameter values through numerical simulation.

Alternatively, the determination of the positions of each pedestrian in the subway station through the indoor pedestrian positioning module using various indoor positioning fusion technologies specifically comprises:

carrying out common band positioning measurement, 5G positioning measurement and inertial sensor positioning measurement to obtain different measurement signals;

estimating the basic positions of the pedestrians according to the measurement signals to obtain the basic position information of the pedestrians;

acquiring Bluetooth fingerprint positioning information;

carrying out position result fusion according to the Bluetooth fingerprint positioning information and the basic position information of the pedestrians to obtain fused position information; and carrying out positioning decision making according to the fused position information by means of a positioning scene identification method, a hybrid positioning algorithm and route fitting, so as to determine the positions of the pedestrians in the subway station.

Alternatively, the planning of the dynamic escape route guide map for each pedestrian according to the actual situation based on the fire information, the fire source position, the smoke diffusion information and the pedestrian positions, and the sending of the dynamic escape route guide map to the mobile device APP specifically comprise:

acquiring pedestrian information collected by a subway APP and pedestrian information collected by a map management system; and planning the dynamic escape route guide map for each pedestrian based on the fire information, the fire source position, the smoke diffusion information, the pedestrian positions, the pedestrian information collected by the subway APP and the pedestrian information collected by the map management system, and sending the dynamic escape route guide map to the mobile device APP.

According to the specific embodiments provided by the invention, the invention discloses the following technical effects:

The invention provides an intelligent evacuation system and method used in a subway station fire. The system comprises a fire alarm module, a fire source positioning module, an indoor pedestrian positioning module, a relay control module and a master control module; the fire alarm module is used for discovering a fire and transmitting fire information; the fire alarm module is connected with the fire source positioning module, and the fire source positioning module is used for positioning a fire source according to the collected picture information and smoke information of the fire; the indoor pedestrian positioning module is used for positioning pedestrians in a subway station; the relay control module is connected with the fire alarm module, the fire source positioning module and the indoor pedestrian positioning module, and the relay control module is used for combining fire information, fire source positioning information and pedestrian positioning information; and the master control module is connected with the relay control module, and the master control module is used for planning a dynamic escape route for each pedestrian according to the combined information, pedestrian information collected by a subway APP and pedestrian information collected by a map management system, and generating an escape route guide map. By means of the above system, the position of a fire source can be quickly determined, and the speed and direction of smoke diffusion in different fire source positions can be studied. Based on the information such as pedestrian positions and spatial distribution characteristics, the escape route can be dynamically optimized, and pedestrians can be guided to evacuate quickly.

BRIEF DESCRIPTION OF THE DRAWINGS

In order to more clearly explain the embodiments of the present invention or the technical scheme in the prior art, the following will briefly introduce the drawings needed in the embodiments. Obviously, the drawings in the following description are only some embodiments of the present invention. For those skilled in the art, other drawings can be obtained according to these drawings without creative labor.

DESCRIPTION OF THE EMBODIMENTS

Hereinafter, the technical scheme in the embodiments of the present invention will be described clearly and completely with reference to the drawings in the embodiments of the present invention. Obviously, the described embodiments are only part of the embodiments of the present invention, not all of the embodiments. Based on the embodiments of the present invention, all other embodiments obtained by those of ordinary skill in the art without creative labor are within the scope of the present invention.

The invention aims to provide an intelligent evacuation system and method used in a subway station fire, which can quickly determine the position of a fire source, position pedestrians with high precision, and dynamically plan the best escape route for individuals in a fire.

In order to make the above objects, features and advantages of the present invention better understood, the present invention will be described in further detail below with reference to the accompanying drawings and detailed description.

Embodiment 1

Figure 1:
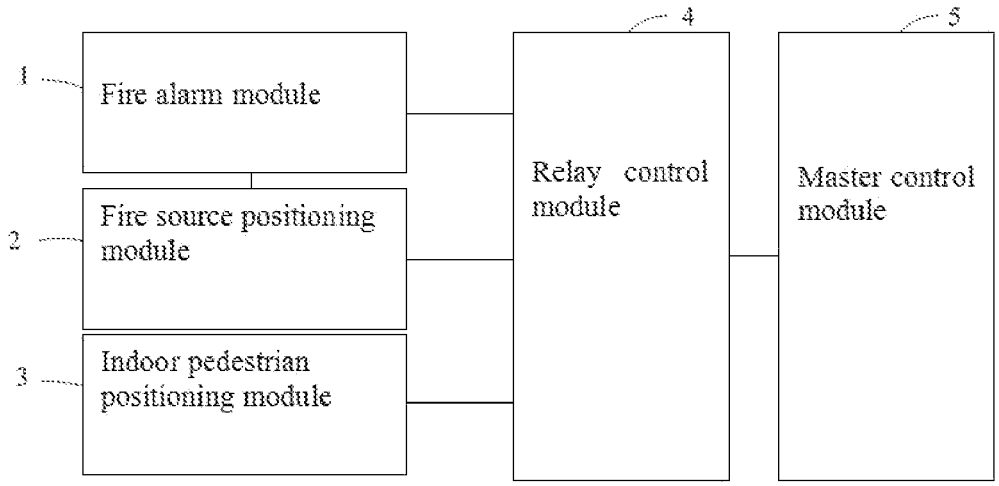
FIG. 1 is a structural diagram of an intelligent evacuation system used in a subway station fire according to the present invention.

FIG. 1 is a structural diagram of an intelligent evacuation system used in a subway station fire according to the present invention. As shown in FIG. 1, an intelligent evacuation system used in a subway station fire comprises a terminal node, a relay control module 4 and a master control module 5; the terminal node comprises a fire alarm module 1, a fire source positioning module 2 and an indoor pedestrian positioning module 3; the terminal node is used for collecting and processing fire detection, fire source positioning and indoor pedestrian positioning data, sending the detection result of the node and receiving background instructions; the fire alarm module 1 is used for discovering a fire and transmitting fire information; the fire alarm module 1 is connected with the fire source positioning module 2, and the fire source positioning module 2 is used for positioning a fire source according to the collected picture information and smoke information of the fire; the indoor pedestrian positioning module 3 is used for positioning pedestrians in a subway station; the relay control module 4 is connected with the fire alarm module 1, the fire source positioning module 2 and the indoor pedestrian positioning module 3, and the relay control module 4 is used for combining fire information, fire source positioning information and pedestrian positioning information; and the master control module 5 is connected with the relay control module 4, and the master control module 5 is used for planning a dynamic escape route for each pedestrian according to the combined information, pedestrian information collected by a subway APP and pedestrian information collected by a map management system, and generating an escape route guide map.

The fire alarm module 1 comprises fire detectors, microprocessors, digital radio stations and fire control facility modules, the fire detectors are used for discovering a fire, and the microprocessors are connected with the fire detectors; the microprocessors are used for receiving a fire signal, the digital radio stations are connected with the microprocessors, and the digital radio stations are used for receiving and transmitting the fire signal; and the fire control facility modules are connected with the microprocessors, the fire control facility modules are used for switching on relevant fire control equipment according to the fire signal, and the microprocessors are connected with the relay control module 4.

The fire source positioning module 2 comprises a binocular camera, a smoke sensor probe and a central controller, the binocular camera is used for collecting the video sequence of a fire, the smoke sensor probe is used for collecting smoke information, the central controller is connected with the binocular camera and the smoke sensor probe, the central controller is used for analyzing and processing the video sequence and the smoke information to determine the position of a fire source, and the central controller is connected with the relay control module 4.

The indoor pedestrian positioning module 3 comprises switches, 5G base stations, WLAN base stations, decision control systems and mobile devices, and the switches are used for providing a communication port for an APP to read position information; the 5G base stations and the WLAN base stations serve as acquisition receivers to acquire the time when pedestrians reach a preset place; the mobile devices are used for sending out a real-time movement signal; and the decision control systems are connected with the switches, the 5G base stations, the WLAN base stations and the mobile devices, the decision control systems are used for determining indoor pedestrian positions according to time information and the real-time movement signal information, and the decision control systems are connected with the relay control module 4.

The invention develops an intelligent evacuation system used in a subway station fire based on the 5G technology, machine vision, indoor positioning and the like. The intelligent evacuation system is of a three-level framework consisting of the terminal node, the relay control modules 4 and the master control module 5, and realizes the following functions on the basis of existing research:

The system adopts the three-level framework to ensure the reliability of the whole system in a complex environment, and the 5G wireless communication technology is adopted to ensure the security of the whole framework and the timeliness of information transmission. The system studies the quick positioning of a fire source and the speed and direction of smoke diffusion in different fire source positions, and based on the information such as pedestrian positions and spatial distribution characteristics, dynamically optimizes the escape route, and guides pedestrians to evacuate quickly. The system uses the 5G technology to carry out high-precision positioning research on the personnel to be evacuated in the station, thus avoiding the problems of low positioning precision, inability to distinguish floors and the like existing in the indoor positioning process of the traditional positioning technology. The system uses the image-based fire source detection technology based on deep learning, and uses Internet of Things to realize networking of the original independent fire probes, so as to quickly locate the fire point and determine the position of the fire source. The intelligent smoke sensor probe is installed, and the smoke diffusion speed and direction can be calculated from the acquired information. The system realizes high-precision positioning of pedestrians in the subway station, and determines the specific position of each pedestrian, so as to lay a foundation for sending accurate and targeted escape route guidance information to each pedestrian. Based on the information such as personal location, fire source location, pedestrian flow trajectory, exit location, the difference between available safe evacuation time and required safe evacuation time, the system dynamically plans the best escape route for each individual in a fire, and develops a pedestrian dynamic escape route guide map.

Embodiment 2

Figure 2:
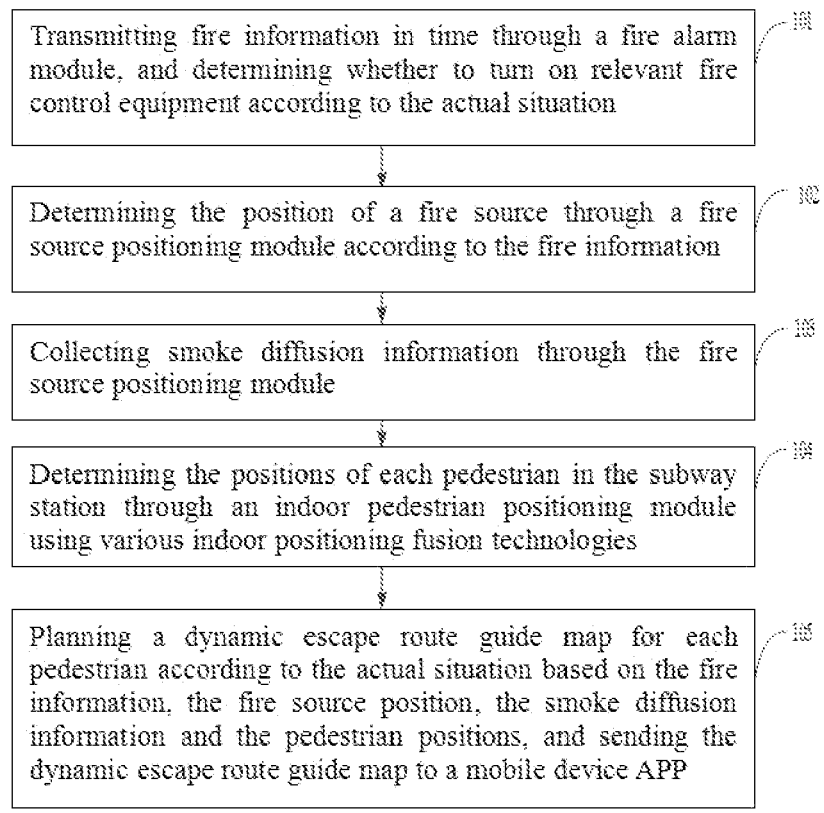
FIG. 2 is a flow chart of an intelligent evacuation method used in a subway station fire according to the present invention.

FIG. 2 is a flow chart of an intelligent evacuation method used in a subway station fire according to the present invention. As shown in FIG. 2, an intelligent evacuation method used in a subway station fire comprises:

Step 101: transmitting fire information in time through a fire alarm module, and determining whether to turn on relevant fire control equipment according to the actual situation, specifically comprising:

obtaining a fire signal after a fire is discovered in a subway station through fire detectors;

transmitting the fire signal through a microprocessor and a digital radio station; and determining whether to turn on or turn off the fire control equipment according to the fire signal.

Figure 6:
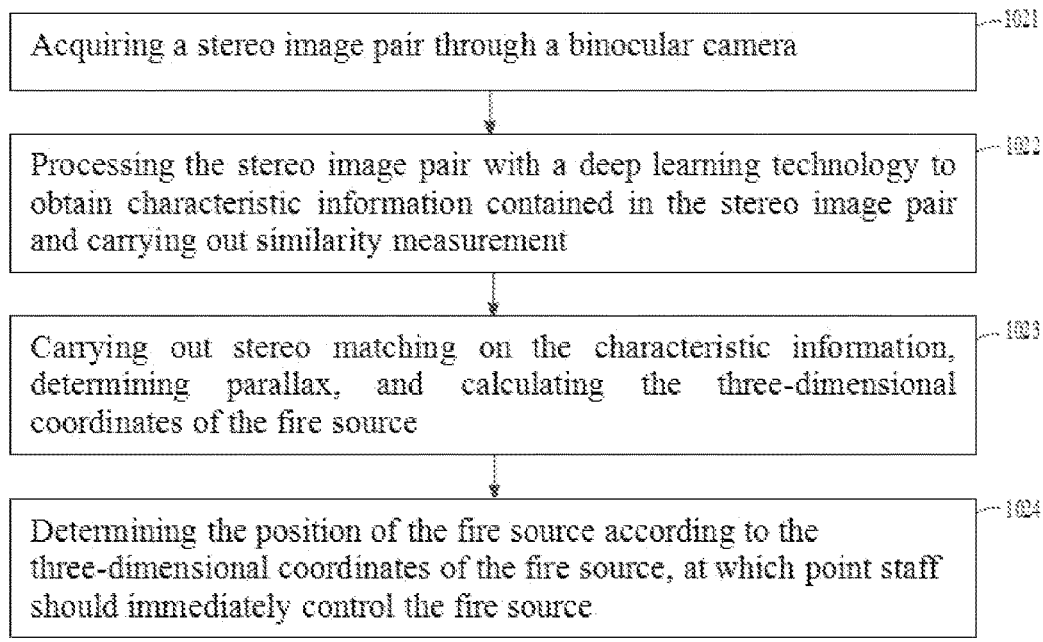
FIG. 6 is a flowchart of a method for determining the position of a fire source according to the present invention.

Step 102, determining the position of a fire source through a fire source positioning module according to the fire information, specifically comprising:

step 1021, acquiring a stereo image pair through a binocular camera;

step 1022, processing the stereo image pair with a deep learning technology to obtain characteristic information contained in the stereo image pair and carrying out similarity measurement;

step 1023, carrying out stereo matching on the characteristic information, determining parallax, and calculating the three-dimensional coordinates of the fire source; and step 1024, determining the position of the fire source according to the three-dimensional coordinates of the fire source, at which point staff should immediately control the fire source. FIG. 6 is a flowchart of a method for determining the position of a fire source according to the present invention.

The following step is executed before step 1021:

calibrating the internal and external parameters of the binocular camera.

Step 1022 specifically comprises:

carrying out target capturing on the fire source in the acquired stereo image pair;

preprocessing the stereo image pair, including image region segmentation, scale normalization and gray normalization;

automatically learning feature information contained in the stereo image pair through a convolution neural network; and setting a threshold value for similarity measurement, determining the target as a fire source in the case of exceeding the threshold value and executing the next step; otherwise, processing the next frame of image.

Figure 3:
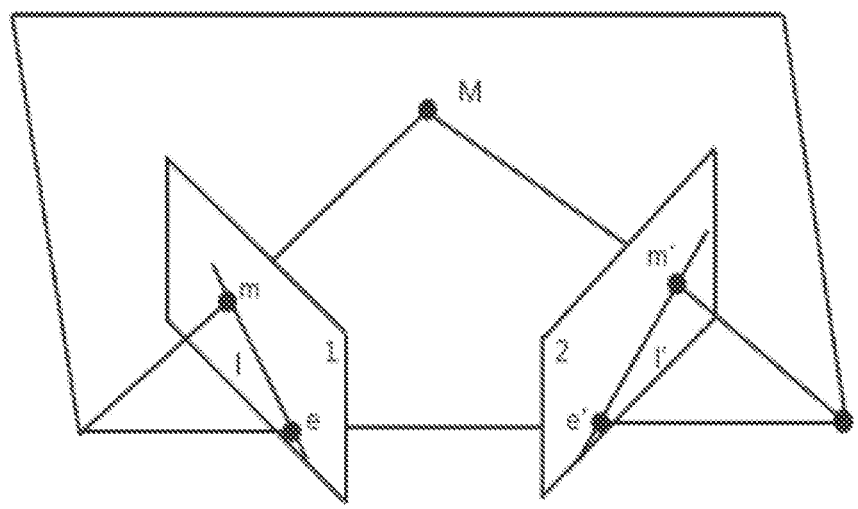
FIG. 3 is an epipolar geometry diagram of a binocular camera according to the present invention.

In step 1023, the following method is adopted to calculate the three-dimensional coordinates so as to determine the position of the fire source in FIG. 3: images of a flame scene in the same three-dimensional space under different viewing angles are captured with a left camera and a right camera respectively, and from the principle of epipolar geometry, it is known that the back projection rays 1 and 1' of the matching point pair m and m' determine a polar plane passing through the optical centers of the two cameras, and 1 and 1' must intersect at a space point. Meanwhile, the baselines between 1 and 1' and the two cameras form a triangle, the optical centers of the cameras 1 and 2 serve as two vertices respectively, and the other vertex is the intersection point of the two back projection rays, which is the space point to be determined. On this basis, the projection matrices of the two cameras are set to be $C_1$ and $C_2$ respectively, and $C_1=k_1[I|0]$, $C_2=k_2[R|T]$. The origin of the world coordinate system is selected at the position of the camera 1. The position of the camera 2 is obtained through rotation and translation of the camera 1, and $k_1$ and $k_2$ are the internal parameter matrices of the two cameras respectively.

R and T are the rotation and translation matrices respectively. The geometric relationship between the two-dimensional image and the three-dimensional space position is expressed by the formula $\lambda m=CM$. The solution of M can be obtained through the relationship between the camera 1 and the camera 2. Meanwhile, the three-dimensional space coordinates in the formula $\lambda m=CM$ can be solved by using the least square method. Since the two cameras of the binocular camera are placed in parallel in the shooting process and the baseline distance is known, the three-dimensional coordinates of the fire source calculated through the projection matrices are the actual space coordinates.

Step 103: collecting smoke diffusion information through the fire source positioning module, specifically comprising:

collecting smoke information through a smoke sensor probe;

setting a fire scene, maximum heat release power and on-off parameter values of fire control hardware facilities by using a central controller according to the position of the fire source; and obtaining smoke diffusion direction and diffusion speed information according to the smoke information and the on-off parameter values through numerical simulation.

Before studying the smoke flow law by numerical simulation, it is necessary to set the relevant parameters such as environment, fire source and working condition. The first step of setting a fire scene, maximum heat release power and on-off parameter values of fire control hardware facilities is to prepare for the second step of numerical simulation.

When a fire occurs in a subway station, the flow of fire smoke is an unsteady three-dimensional turbulent flow. The following basic equations should be satisfied for calculating the movement laws of subway fire smoke diffusion direction and speed:

Continuity equation:

$$\frac{\partial \rho}{\partial t} + \frac{\partial (\rho \mu_j)}{\partial x_j} = 0$$

Momentum equation:

$$\frac{\partial (\rho \mu_j)}{\partial t} + \frac{\partial (\rho \mu_j \mu_i)}{\partial x_j} = \frac{\partial P}{\partial x_i} + (\rho - \rho_0)g_i + \frac{\partial}{\partial x_j}\mu\left(\frac{\partial \mu_i}{\partial x_j} + \frac{\partial \mu_j}{\partial x_i}\right) + \frac{1}{3}\frac{\partial}{\partial x_i}\mu\left(\frac{\partial \mu_j}{\partial x_j}\right)$$

Energy equation:

$$\frac{\partial (\rho c_P T)}{\partial t} + \frac{\partial (\rho \mu_i c_P T)}{\partial x_i} = \frac{\partial}{\partial x_i}\left(\lambda \frac{\partial T}{\partial x_i}\right) + q$$

Concentration equation:

$$\frac{\partial (\rho C_S)}{\partial t} + \frac{\partial (\rho \mu_i C_S)}{\partial x_i} = \frac{\partial}{\partial x_i}\left(\rho D_S \frac{\partial C_S}{\partial x_i}\right) + m_s$$

State equation: $P=\rho RT$

Inter-boundary heat transfer equation:

$$\left(\frac{\rho c}{\lambda_s}\right)\frac{\partial T_s}{\partial t} = \frac{\partial T_s}{\partial x_s^2}$$

Inner wall boundary conditions:

$$-\lambda_S \frac{\partial T_s}{\partial x_s} = \frac{\lambda C_1}{L} R_e^{0.8}(T - T_S)$$

wherein, $\mu_i$ and $\mu_j$ are the smoke diffusion speed components, P is the smoke pressure, P is the smoke density, $\rho_0$ is the initial density, T is the ambient temperature, $g_i$ is the gravitational acceleration, $c_P$ is the air specific heat capacity, $\lambda$ is the air heat conductivity coefficient, q is the heat radiation flux, $C_S$ is the mass fraction of the component, $D_S$ is the diffusion coefficient of the component, $m_s$ is the mass generation rate of the component, R is the gas constant, $T_s$ is the wall temperature, $\lambda_s$ is the heat conductivity coefficient of the component, $R_e^{0.8}$ is the Reynolds number, $C_1 = 0.036 P_r^{1/3}$, and P is the Prandtl number.

Step 104: determining the positions of each pedestrian in the subway station through an indoor pedestrian positioning module using various indoor positioning fusion technologies, specifically comprising:

carrying out various signal measurements including common band positioning measurement, 5G positioning measurement and inertial sensor positioning measurement to obtain different measurement signals;

estimating the basic positions of the pedestrians according to the measurement signals to obtain the basic position information of the pedestrians;

acquiring Bluetooth fingerprint positioning information;

carrying out position result fusion according to the Bluetooth fingerprint positioning information and the basic position information of the pedestrians to obtain fused position information; and carrying out positioning decision making according to the fused position information by means of a positioning scene identification method, a hybrid positioning algorithm and route fitting, so as to determine the positions of the pedestrians in the subway station.

Figure 4:
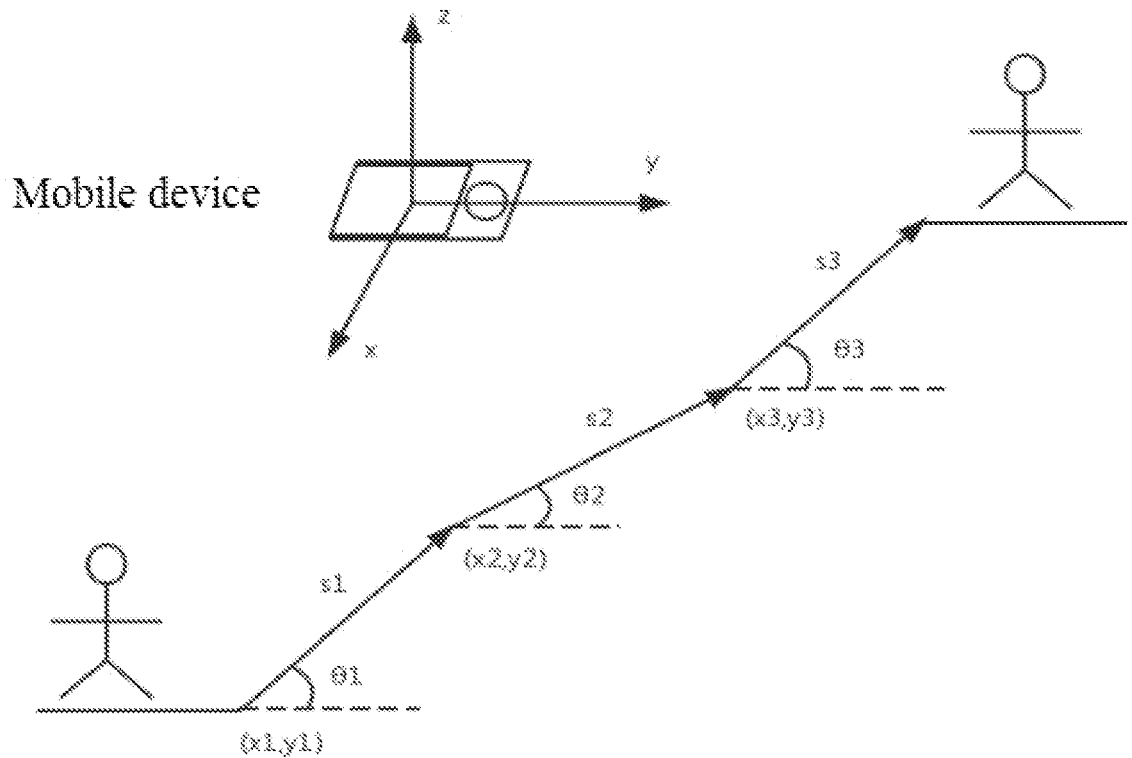
FIG. 4 is a schematic diagram of pedestrian dead reckoning according to the present invention.

The principle of various indoor positioning fusion technologies based on 5G is as follows:

(1) Pedestrian dead reckoning is carried out first, an inertial sensor (gyroscope, accelerometer, magnetometer, etc.) built in a mobile phone is used to estimate the step size, gait and heading angle of each pedestrian in FIG. 4, and the distances between different base stations and the mobile devices of the pedestrians are calculated by acquiring 5G signal strength and using an indoor signal transmission model, so as to estimate the specific positions of the pedestrians. Assuming that the actual position coordinates are $(x_1,y_1)$, the position information of the next step $(x_2,y_2)$ is calculated according to the step size $s_1$ and the heading angle $\theta_1$, and the calculation formula is $$\begin{cases} x_2 = x_1 + s_1 \sin\theta_1 \\ y_2 = y_1 + s_1 \cos\theta_1 \end{cases}.$$

The distance between the mobile device carried by the pedestrian and the corresponding access point is calculated by using a Hata-Okumaram model, $$\log d = \frac{1}{10n}(P_{TX} - P_{RX} + G_{TX} + G_{RX} - X_\alpha + 20\log\lambda - 20\log(4\pi))$$

wherein d represents the distance between the 5G base station and the mobile device, $P_{TX}$ represents the output signal strength of the 5G base station, $P_{RX}$ represents the signal strength received by the mobile device, $G_{TX}$ represents the antenna gain of the 5G base station, $G_{RX}$ represents the antenna gain of the mobile device, $\lambda$ represents the signal wavelength, n is the signal blockage factor, and $X_\alpha$ is a random variable with a standard deviation of $\alpha$.

Figure 5:
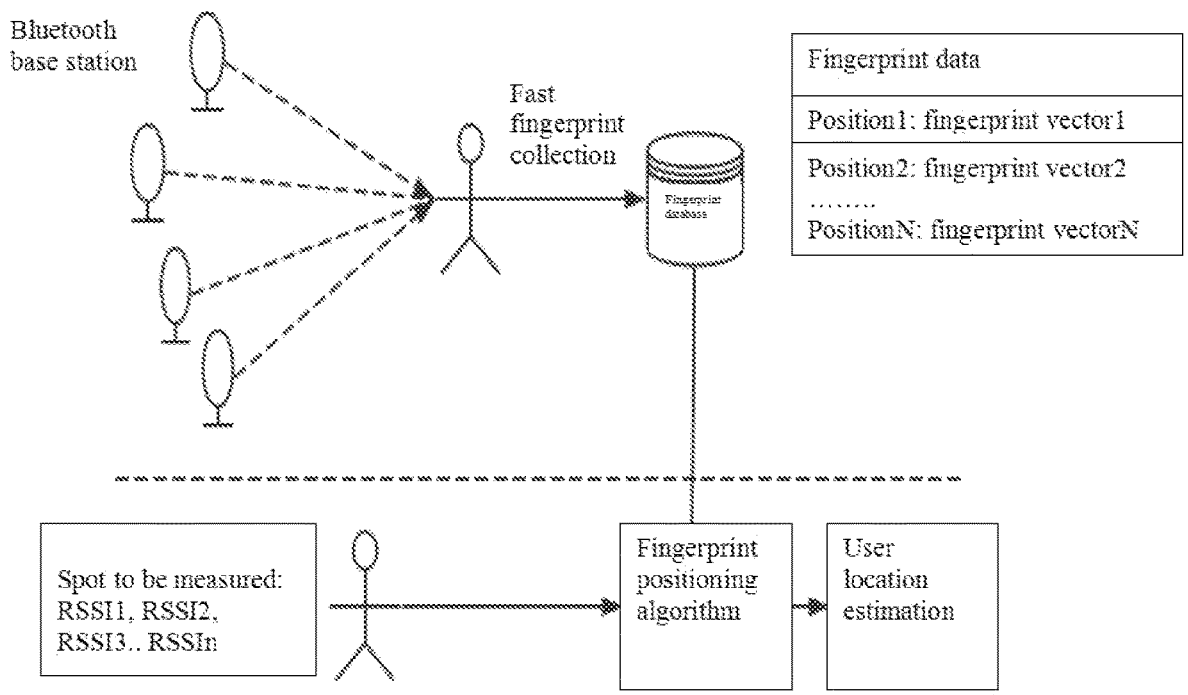
FIG. 5 is a schematic diagram of Bluetooth fingerprint positioning according to the present invention.

(2) Bluetooth fingerprint positioning is then carried out in FIG. 5. When approaching a Bluetooth transmitter, the mobile device receives a broadcast signal transmitted by Bluetooth. The broadcast signal periodically transmitted by the Bluetooth base station includes the unique physical address code Mac address and the signal strength indication RSSI. A mobile device terminal receives signals sent by multiple Bluetooth base stations at the current location at the same time. The signals are attenuated differently due to different distances. Based on different signal strength sequences of different Bluetooth base stations at the current location, the RSSI sequences uniquely marked by the current location can be obtained as reference fingerprints. During online positioning, the scanned Bluetooth signal strength sequence is matched with the reference fingerprint sequence in a fingerprint database, thus calculating the target position with the greatest probability.

(3) An extended Kalman filter is used to fuse the above positioning modes, and the state equation and observation equation are established as follows:

$$X_k = \begin{bmatrix} x_k \\ y_k \\ \theta_k \end{bmatrix} = \begin{bmatrix} x_k + s_{k-1}\sin\theta_{k-1} \\ y_k + s_{k-1}\cos\theta_{k-1} \\ \theta_{k-1} + \Delta\theta \end{bmatrix} + w; Z_k = \begin{bmatrix} \bar{x}_k \\ \bar{y}_k \\ s_k \\ \theta_k \end{bmatrix} + V,$$

wherein W~N(0, Q), V~N(0, R), W and V are independent of each other, and Q and R represent the covariance of system process noise and the covariance of observation process noise respectively. In the state equation, $(x_k, y_k)$ represents the predicted position of the pedestrian at the K<th> step; $\theta_k$ represents the predicted heading angle at the K<th> step; $\Delta\theta$ is the heading angle increment and can be set as a constant; and in the observation equation, $(x_k, y_k)$ represents the Bluetooth positioning position; and $s_k$ and $\theta_k$ represent the step size and heading angle at the K<th> step.

Step 105: planning a dynamic escape route guide map for each pedestrian according to the actual situation based on the fire information, the fire source position, the smoke diffusion information and the pedestrian positions, and sending the dynamic escape route guide map to a mobile device APP, specifically comprising:

acquiring pedestrian information collected by a subway APP and pedestrian information collected by a map management system; and planning the dynamic escape route guide map for each pedestrian based on the fire information, the fire source position, the smoke diffusion information, the pedestrian positions, the pedestrian information collected by the subway APP and the pedestrian information collected by the map management system, and sending the dynamic escape route guide map to the mobile device APP.

Information such as fire source, smoke and pedestrian positioning is collected through hardware facilities in the terminal node and transmitted to the relay control module through 5G wireless communication; the relay control module scans, combines and processes the data information collected by the terminal node, and transmits the data information to an intelligent server of the master control module through 5G wireless communication; the intelligent server of the master control module carries out optimization analysis according to the processed data in combination with the map management system to plan the escape route, and pushes the obtained optimal route to a mobile device APP of the pedestrian; the pedestrian receives the visual escape route through the subway APP and is evacuated according to relevant prompts; and in the evacuation process, the intelligent server can control a background program of the APP to update the escape route in real time according to the changes of the actual situation on site.

The intelligent server receives information such as fire source position, smoke diffusion law and pedestrian positioning, and combined with the spatial layout of the subway station, marks the fire source position, smoke concentration and pedestrian flow density in the station in a navigation map through the map management system, so that pedestrians have a preliminary understanding of the fire condition in the station. Then according to the specific positions of pedestrians, smoke concentration, pedestrian flow density and other information, optimization analysis is carried out to plan the escape route, so as to ensure that each pedestrian is evacuated according to the optimal escape route, evacuation can be completed in the shortest time, and congestion during evacuation can be avoided. Finally, the optimal escape route is actively pushed to the mobile device APP of the pedestrian, and the pedestrian is prompted to check in time through broadcasting, and evacuation is carried out according to the dynamic escape route updated in real time.

Various embodiments in this specification are described in a progressive manner. Each embodiment focuses on the differences from other embodiments. The same or similar parts between various embodiments can be referred to each other.

In the present invention, specific examples are applied to explain the principle and implementation of the present invention. The above embodiments are only used to help understand the method of the present invention and its core ideas. For those skilled in the art, according to the idea of the present invention, there will be changes in the specific implementation and application scope. In summary, the contents of this specification should not be construed as limiting the present invention.

What is claimed is:

1. An intelligent evacuation system used in a subway station fire, comprising:
   a terminal node;
   a relay control module; and
   a master control module; wherein:
   the terminal node includes: a fire alarm module, a fire source positioning module, and an indoor pedestrian positioning module;
   the terminal node is used for collecting and processing fire detection, fire source positioning and indoor pedestrian positioning data, sending the detection result of the terminal node and receiving background instructions;
   the fire alarm module is used for discovering a fire and transmitting fire information;
   the fire alarm module is connected with the fire source positioning module, and the fire source positioning module is used for positioning a fire source according to collected picture information and smoke information of the fire;
   the indoor pedestrian positioning module is used for positioning pedestrians in a subway station;
   the relay control module is connected with the fire alarm module, the fire source positioning module and the indoor pedestrian positioning module, and the relay control module is used for combining fire information, fire source positioning information, and pedestrian positioning information;
   the master control module is connected with the relay control module, and the master control module is used for planning a dynamic escape route for each pedestrian according to the combined information, pedestrian information collected by a subway application (APP) and pedestrian information collected by a map management system, and generating an escape route guide map;
   the indoor pedestrian positioning module includes: switches, 5G base stations, WLAN base stations, decision control systems, and mobile devices;
   the switches are used for providing a communication port for an APP to read position information;
   the 5G base stations and the WLAN base stations serve as acquisition receivers to acquire the time when pedestrians reach a preset place;
   the mobile devices are used for sending out a real-time movement signal; and
   the decision control systems are connected with the switches, the 5G base stations, the WLAN base stations and the mobile devices, the decision control systems are used for determining indoor pedestrian positions according to time information and the real-time movement signal information, and the decision control systems are connected with the relay control module.

2. The intelligent evacuation system used in a subway station fire according to claim 1, wherein:
   the fire alarm module includes: fire detectors, microprocessors, digital radio stations and fire control facility modules, the fire detectors are used for discovering a fire, and the microprocessors are connected with the fire detectors;
   the microprocessors are used for receiving a fire signal, the digital radio stations are connected with the microprocessors, and the digital radio stations are used for receiving and transmitting the fire signal; and
   the fire control facility modules are connected with the microprocessors, the fire control facility modules are used for switching on relevant fire control equipment according to the fire signal, and the microprocessors are connected with the relay control module.

3. The intelligent evacuation system used in a subway station fire according to claim 1, wherein:
   the fire source positioning module includes a binocular camera, a smoke sensor probe and a central controller;
   the binocular camera is used for collecting the video sequence of a fire;
   the smoke sensor probe is used for collecting smoke information;
   the central controller is connected with the binocular camera; and
   the smoke sensor probe, the central controller is used for analyzing and processing the video sequence and the smoke information to determine the position of a fire source, and the central controller is connected with the relay control module.

4. An intelligent evacuation method used in a subway station fire, wherein the method is applied to the intelligent evacuation system used in a subway station fire according to claim 3, and the method comprises:
transmitting fire information in time through a fire alarm module, and determining whether to turn on relevant fire control equipment according to the actual situation;
determining the position of a fire source through a fire source positioning module according to the fire information;
collecting smoke diffusion information through the fire source positioning module;
determining the positions of each pedestrian in the subway station through an indoor pedestrian positioning module using various indoor positioning fusion technologies; and
planning a dynamic escape route guide map for each pedestrian according to the actual situation based on the fire information, the fire source position, the smoke diffusion information and the pedestrian positions, and sending the dynamic escape route guide map to a mobile device APP.

5. The intelligent evacuation method used in a subway station fire according to claim 4, wherein the transmission of the fire information in time through the fire alarm module and the determination as to whether to turn on relevant fire control equipment according to the actual situation includes:
obtaining a fire signal after a fire is discovered in a subway station through a fire detector;
transmitting the fire signal through a microprocessor and a digital radio station; and
determining whether to turn on or turn off the fire control equipment according to the fire signal.

6. The intelligent evacuation method used in a subway station fire according to claim 4, wherein the determination of the position of a fire source through the fire source positioning module according to the fire information includes:
acquiring a stereo image pair through a binocular camera;
processing the stereo image pair with a depth learning technology to obtain characteristic information contained in the stereo image pair and carrying out similarity measurement;
carrying out stereo matching on the characteristic information, determining parallax, and calculating the three-dimensional coordinates of the fire source; and
determining the position of the fire source according to the three-dimensional coordinates of the fire source.

7. An intelligent evacuation method used in a subway station fire, wherein the method is applied to the intelligent evacuation system used in a subway station fire according to claim 1, and the method comprises:
transmitting fire information in time through a fire alarm module, and determining whether to turn on relevant fire control equipment according to the actual situation;
determining the position of a fire source through a fire source positioning module according to the fire information;
collecting smoke diffusion information through the fire source positioning module;
determining the positions of each pedestrian in the subway station through an indoor pedestrian positioning module using various indoor positioning fusion technologies; and
planning a dynamic escape route guide map for each pedestrian according to the actual situation based on the fire information, the fire source position, the smoke diffusion information and the pedestrian positions, and sending the dynamic escape route guide map to a mobile device APP.

8. The intelligent evacuation method used in a subway station fire according to claim 7, wherein the transmission of the fire information in time through the fire alarm module and the determination as to whether to turn on relevant fire control equipment according to the actual situation includes:
obtaining a fire signal after a fire is discovered in a subway station through a fire detector;
transmitting the fire signal through a microprocessor and a digital radio station; and
determining whether to turn on or turn off the fire control equipment according to the fire signal.

9. The intelligent evacuation method used in a subway station fire according to claim 7, wherein the determination of the position of a fire source through the fire source positioning module according to the fire information includes:
acquiring a stereo image pair through a binocular camera;
processing the stereo image pair with a depth learning technology to obtain characteristic information contained in the stereo image pair and carrying out similarity measurement;
carrying out stereo matching on the characteristic information, determining parallax, and calculating the three-dimensional coordinates of the fire source; and
determining the position of the fire source according to the three-dimensional coordinates of the fire source.

10. The intelligent evacuation method used in a subway station fire according to claim 7, wherein the collection of the smoke diffusion information through the fire source positioning module includes:
collecting smoke information through a smoke sensor probe;
setting a fire scene, maximum heat release power and on-off parameter values of fire control hardware facilities by using a central controller according to the position of the fire source; and
obtaining smoke diffusion direction and diffusion speed information according to the smoke information and the on-off parameter values through numerical simulation.

11. The intelligent evacuation method used in a subway station fire according to claim 7, wherein the determination of the positions of each pedestrian in the subway station through the indoor pedestrian positioning module using various indoor positioning fusion technologies includes:
carrying out common band positioning measurement, 5G positioning measurement and inertial sensor positioning measurement to obtain different measurement signals;
estimating the basic positions of the pedestrians according to the measurement signals to obtain the basic position information of the pedestrians;
acquiring Bluetooth fingerprint positioning information;
carrying out position result fusion according to the Bluetooth fingerprint positioning information and the basic position information of the pedestrians to obtain fused position information; and
carrying out positioning decision making according to the fused position information by means of a positioning scene identification method, a hybrid positioning algorithm and route fitting, so as to determine the positions of the pedestrians in the subway station.

12. The intelligent evacuation method used in a subway station fire according to claim 7, wherein the planning of the dynamic escape route guide map for each pedestrian according to the actual situation based on the fire information, the fire source position, the smoke diffusion information and the pedestrian positions, and the sending of the dynamic escape route guide map to the mobile device APP includes:

acquiring pedestrian information collected by a subway APP and pedestrian information collected by a map management system; and planning the dynamic escape route guide map for each pedestrian based on the fire information, the fire source position, the smoke diffusion information, the pedestrian positions, the pedestrian information collected by the subway APP and the pedestrian information collected by the map management system, and sending the dynamic escape route guide map to the mobile device APP.

13. An intelligent evacuation method used in a subway station fire, wherein the method is applied to the intelligent evacuation system used in a subway station fire according to claim 2, and the method comprises:

transmitting fire information in time through a fire alarm module, and determining whether to turn on relevant fire control equipment according to the actual situation;

determining the position of a fire source through a fire source positioning module according to the fire information;

collecting smoke diffusion information through the fire source positioning module;

determining the positions of each pedestrian in the subway station through an indoor pedestrian positioning module using various indoor positioning fusion technologies; and planning a dynamic escape route guide map for each pedestrian according to the actual situation based on the fire information, the fire source position, the smoke diffusion information and the pedestrian positions, and sending the dynamic escape route guide map to a mobile device APP.

14. The intelligent evacuation method used in a subway station fire according to claim 13, wherein the transmission of the fire information in time through the fire alarm module and the determination as to whether to turn on relevant fire control equipment according to the actual situation incudes:

obtaining a fire signal after a fire is discovered in a subway station through a fire detector;

transmitting the fire signal through a microprocessor and a digital radio station; and determining whether to turn on or turn off the fire control equipment according to the fire signal.

15. The intelligent evacuation method used in a subway station fire according to claim 13, wherein the determination of the position of a fire source through the fire source positioning module according to the fire information includes:

acquiring a stereo image pair through a binocular camera;

processing the stereo image pair with a depth learning technology to obtain characteristic information contained in the stereo image pair and carrying out similarity measurement;

carrying out stereo matching on the characteristic information, determining parallax, and calculating the three-dimensional coordinates of the fire source; and determining the position of the fire source according to the three-dimensional coordinates of the fire source.

16. The intelligent evacuation method used in a subway station fire according to claim 13, wherein the collection of the smoke diffusion information through the fire source positioning module includes:

collecting smoke information through a smoke sensor probe;

setting a fire scene, maximum heat release power and on-off parameter values of fire control hardware facilities by using a central controller according to the position of the fire source; and obtaining smoke diffusion direction and diffusion speed information according to the smoke information and the on-off parameter values through numerical simulation.

* * * * *